(12) United States Patent
Shinoda et al.

(10) Patent No.: US 11,656,360 B2
(45) Date of Patent: May 23, 2023

(54) LOCATION INFORMATION SYSTEM

(71) Applicant: TOYOTA JIDOSHA KABUSHIKI KAISHA, Aichi (JP)

(72) Inventors: Keisuke Shinoda, Miyoshi (JP); Koji Kawasaki, Anjo (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 33 days.

(21) Appl. No.: 17/334,803

(22) Filed: May 31, 2021

(65) Prior Publication Data

US 2021/0373175 A1 Dec. 2, 2021

(30) Foreign Application Priority Data

Jun. 1, 2020 (JP) .............................. JP2020-095741

(51) Int. Cl.
*G01S 19/07* (2010.01)
*H04W 88/02* (2009.01)
*H04W 88/08* (2009.01)

(52) U.S. Cl.
CPC ........... *G01S 19/073* (2019.08); *H04W 88/02* (2013.01); *H04W 88/08* (2013.01)

(58) Field of Classification Search
CPC ..... G01S 19/073; H04W 88/02; H04W 88/08; H04W 4/02; H04W 4/40; H04W 4/44
See application file for complete search history.

(56) References Cited

U.S. PATENT DOCUMENTS

| 2010/0265092 A1* | 10/2010 | Kim ..................... H04W 64/003 340/8.1 |
| 2010/0317390 A1* | 12/2010 | Rekimoto ............. H04W 64/00 455/511 |
| 2020/0408927 A1* | 12/2020 | Youssef ................ H04W 4/025 |

FOREIGN PATENT DOCUMENTS

| CN | 103918242 A | * | 7/2014 | ............ G08G 1/093 |
| JP | 2000346925 A | | 12/2000 | |
| JP | 200952948 A | | 3/2009 | |
| JP | 2009210407 A | | 9/2009 | |

* cited by examiner

*Primary Examiner* — Umair Ahsan
(74) *Attorney, Agent, or Firm* — Hauptman Ham, LLP (57) ABSTRACT

A location information system may comprise a first mobile body; a plurality of base stations communicable with the first mobile body; and a location obtainer device mounted on a second mobile body and communicable with the plurality of base stations. The first mobile body may comprise a moving mechanism configured to move the first mobile body; and a first location obtainer configured to obtain first location information indicating a location of the first mobile body. Each of the plurality of base stations may comprise a base station location obtainer configured to obtain base station location information indicating a location of the base station. The location obtainer device may comprise a second location obtainer configured to obtain second location information indicating a location of the second mobile body.

10 Claims, 4 Drawing Sheets

LOCATION INFORMATION SYSTEM

CROSS-REFERENCE TO RELATED APPLICATION

This application claims priority to Japanese Patent Application No. 2020-095741 filed on Jun. 1, 2020, the contents of which are hereby incorporated by reference into the present application.

TECHNICAL FIELD

The technique disclosed herein relates to a location information system comprising a plurality of base stations and a mobile body.

Japanese Patent Application Publication No. 2000-346925 describes a location management system for identifying the location of a vehicle. The location management system includes a base station device and a mobile station device mounted on the vehicle. The base station device uses radio waves received from global positioning system (GPS) satellites to create correction information used to correct the location measured by the GIPS and transmits the information to the mobile station device. The mobile station device uses radio waves received from the GPS satellites to create location information indicating the location of the mobile station device. The mobile station device creates corrected location information by correcting the created location information with the received correction information.

SUMMARY

In the above-described system, a base station has to be located such that it can receive radio waves from the GPS satellites, and a GPS receiver has to be installed in the base station to receive radio waves. A location information system for estimating location of a mobile body may include a plurality of base stations for communication with a transferable mobile body. In this case, a device configured to receive radio waves from GPS satellites has to be installed in each one of the plurality of base stations.

The disclosure herein provides a technique that allows each of a plurality of base stations not to receive radio waves from GPS satellites.

A location information system disclosed herein may comprise a first mobile body; a plurality of base stations communicable with the first mobile body; and a location obtainer device mounted on a second mobile body and communicable with the plurality of base stations. The first mobile body may comprise a moving mechanism configured to move the first mobile body; and a first location obtainer configured to obtain first location information indicating a location of the first mobile body. Each of the plurality of base stations may comprise a base station location obtainer configured to obtain base station location information indicating a location of the base station, wherein the location of the base station is obtained by using the first location information and a distance between the first mobile body and the base station. The location obtainer device may comprise a second location obtainer configured to obtain second location information indicating a location of the second mobile body, wherein the location of the second mobile body is obtained by using one or more of the base station location information obtained by one or more of the base stations and a distance between the second mobile body and the one or more of the plurality of base stations.

In the above configuration, the first mobile body has the first location information indicating the location of the first mobile body. The location of each base station may be identified using the first location information and the distance between the first mobile body and the base station. Thus, the location of each base station may be identified without the base stations receiving radio waves from UPS satellites. In this configuration, the location of the second mobile body may be identified using the distance between the base station whose location has been identified and the second mobile body.

DETAILED DESCRIPTION

Some of the features characteristic to the location information system disclosed herein will be listed. It should be noted that the respective technical elements are independent of one another, and are useful solely or in combinations.

The first mobile body may further comprise a distance obtainer configured to obtain plural pieces of distance information, wherein the plural pieces of distance information indicate respective distances between the first mobile body and the plurality of base stations; a base station location estimator configured to estimate locations of the plurality of base stations by using the obtained plural pieces of distance information; and a base station location transmitter configured to transmit, to each of the plurality of base stations, base station location information indicating the estimated location of the base station. Each base station location obtainer may be configured to obtain the base station location information by receiving the base station location information.

With this configuration, the first mobile body may estimate the locations of the base stations. The base stations may obtain their locations estimated by the first mobile body.

At each of a plurality of timings while the first mobile body is moving, the first location obtainer may be configured to obtain the first location information; for the respective base stations, the distance obtainer may be configured to obtain the plural pieces of distance information between the first mobile body and the base stations; and for the respective base stations, the base station location estimator may be configured to estimate locations of the base stations by using the obtained plural pieces of first location information and the plural pieces of distance information.

With this configuration, it is possible to identify, from a positional relationship between the first mobile body and one base station among the plurality of base stations, the location of the base station. Thus, the location of the one base station for which location estimation is to be executed may be estimated without using locations of the other base stations other than that base station.

The first mobile body may further comprise a storage controller configured to cause a storage to cumulatively store the obtained plural pieces of distance information and the obtained plural pieces of first location information. For each of the plurality of base stations, the base station location estimator may be configured to estimate the location of the base station by using corresponding one of the plural pieces of first location information and corresponding one of the plural pieces of distance information which are cumulatively stored in the storage.

With this configuration, the first mobile body may estimate the locations of the base stations using the plural pieces of distance information and the plural pieces of first location information that are cumulatively stored in the storage.

The first location obtainer may be configured to obtain the first location information from an external server. The base station location obtainer may be configured to obtain the base station location information from the external server. The second location obtainer may be configured to obtain the second location information from the external server.

With this configuration, the first mobile body does not have to be provided with a device configured to calculate the location of the first mobile body because the information is obtained from the external server different from the location information system.

The plurality of base stations may be immobile.

With this configuration, the base station location information does not have to be updated every time the location of the second mobile body is to be identified using the base station location information.

The first mobile body may further comprise a plurality of distance obtainers disposed at different height levels, wherein each of the plurality of distance obtainers is configured to obtain distance information indicating a distance between the distance obtainer and a specific base station of the plurality of the base stations; and a base station location estimator configured to estimate locations of the base stations. The first location information may comprise plural pieces of first location information indicating locations of the plurality of distance obtainers. The first location obtainer may be configured to obtain the plural pieces of first location information. The base station location estimator may be configured to estimate a location of the specific base station by using the plural pieces of first location information indicating the locations of the plurality of distance obtainers at each of a plurality of points while the first mobile body is moving and the plural pieces of distance information indicating distances between the specific base station and the plurality of distance obtainers.

In obtaining the location of the specific base station by using the location of the first mobile body and the distance between the first mobile body and the specific base station, when the height-wise position of the first mobile body is unchanged throughout the plurality of points, an actual location where the specific base station is actually located and a wrong location, which is symmetric to the actual location of the specific base station with respect to a plane including the plurality of points, may be estimated. With the above-described configuration, the location of the specific base station is identified by using the plural pieces of first location information indicating the locations of the plurality of distance obtainers disposed at different height levels. This configuration may avoid erroneous estimation for the location of the specific base station.

EMBODIMENTS

First Embodiment

Figure 1:
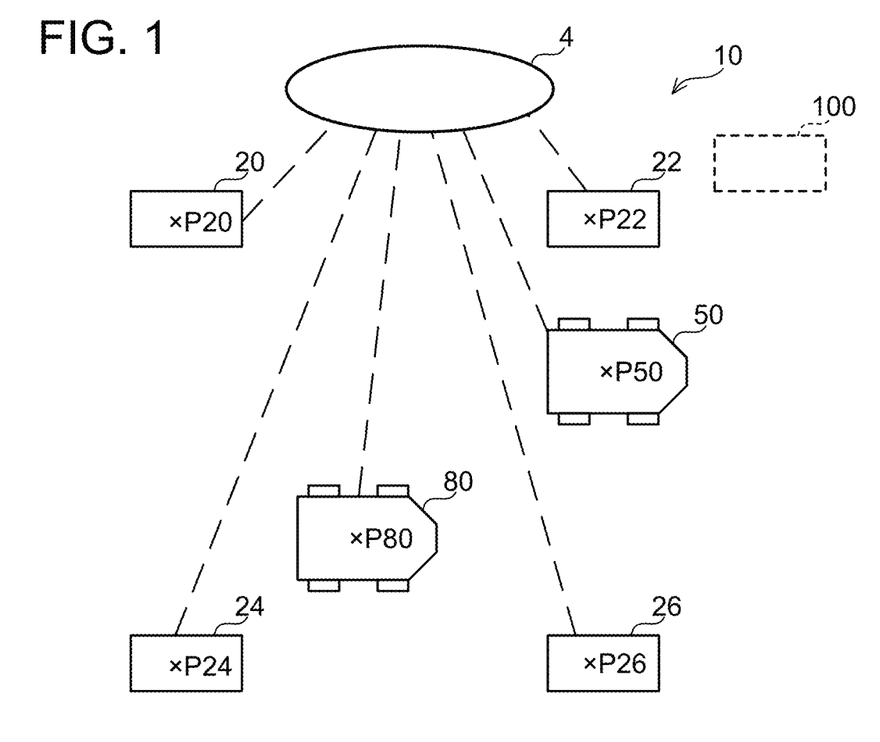
FIG. 1 shows a configuration of a location information system according to an embodiment.

A location information system 10 according to an embodiment shown in FIG. 1 is configured to estimate the location of a second mobile body 80 with a user on board. The location information system 10 includes a plurality of base stations 20, 22, 24, and 26, a first mobile body 50, and a controller 90 mounted on the second mobile body 80. A server 100 depicted by a broken line in FIG. 1 is used in a third embodiment, but is not used in the first embodiment.

(Configurations of Base Stations 20, 22, 24, and 26)

The plurality of base stations 20, 22, 24, and 26 is stationary on the ground. The base stations 20, 22, 24, and 26 are spaced from each other. The base stations 20, 22, 24, and 26 are installed by a provider of the location information system 10.

Figure 2:
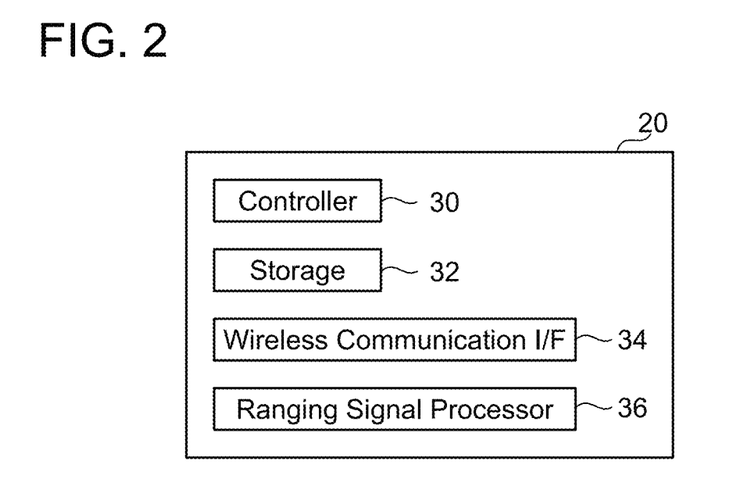
FIG. 2 shows a configuration of a base station.

The base station 20 includes a controller 30, a storage 32, a wireless communication interface 34 (hereinbelow, "interface" will be denoted as "I/F"), and a ranging signal processor 36. The storage 32 includes a memory device such as a hard disk and/or the like. The storage 32 has a storage area that is used to store location information indicating the location of the base station 20. The wireless communication I/F 34 includes an interface configured to be wirelessly communicable with a mobile communications network 4 such as Long Term Evolution (LTE). Owing to the wireless communication IF 34, the base station 20 is wirelessly communicable with external devices via the mobile communications network 4. The wireless communication I/F 34 is wirelessly communicable with the first mobile body 50.

The ranging signal processor 36 includes a transmitter configured to transmit ranging signals such as ultrasound, radio waves, etc., and a receiver configured to receive ranging signals transmitted by other devices. The controller 30 is communicably connected to the storage 32, the wireless communication I/F 34, and the ranging signal processor 36 by wiring (not shown). The controller 30 includes a CPU and a memory. The controller 30 controls the storage 32, the wireless communication I/F 34, and the ranging signal processor 36 in accordance with a computer program stored in the memory.

The base stations 22, 24, and 26 each have the same configuration as the base station 20.

(Configuration of First Mobile Body 50)

Figure 3:
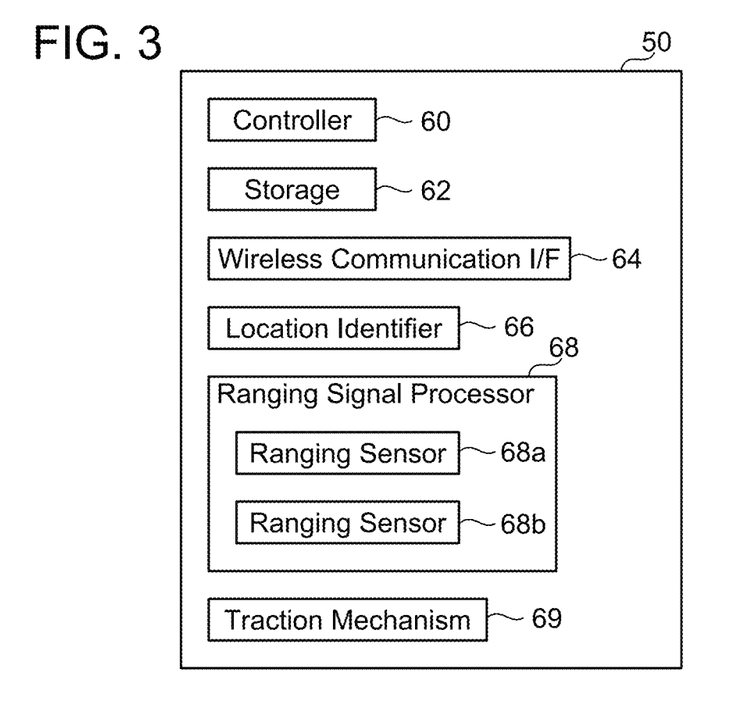
FIG. 3 shows a configuration of a first mobile body.

The first mobile body 50 is a vehicle such as an automobile or the like. As shown in FIG. 3, the first mobile body 50 includes a controller 60, a storage 62, a wireless communication I/F 64, a location identifier 66, a ranging signal processor 68, and a traction mechanism 69. The traction mechanism 69 includes devices used for the first mobile body 50 to travel, such as a drive unit such as an engine, a motor, and/or the like, wheels, a transmission, and the like.

The wireless communication OF 64 has the same configuration as the wireless communication I/F 34. Owing to the wireless communication I/F 64, the first mobile body 50 is wirelessly communicable with external devices via the mobile communications network 4. The wireless communication I/F 64 is wirelessly communicable with the base stations 20, 22, 24, and 26.

The location identifier 66 includes an antenna configured to receive locating signals from a plurality of GPS satellites. The location identifier 66 receives locating signals that it is capable of receiving, among locating signals transmitted from the GPS satellites.

As with the ranging signal processor 36, the ranging signal processor 68 includes two ranging sensors 68a and 68b each including a transmitter configured to transmit ranging signals such as ultrasound, radio waves, etc., and a receiver configured to receive ranging signals transmitted by other devices. The controller 60 is communicably connected to the storage 62, the wireless communication I/F 64, the location identifier 66, and the ranging signal processor 68 by wiring (not shown). The controller 60 includes a CPU and a memory. The controller 60 controls the storage 62, the wireless communication L/F 64, the location identifier 66, and the ranging signal processor 68 in accordance with a computer program stored in the memory.

(Configuration of Second Mobile Body 80)

Figure 4:
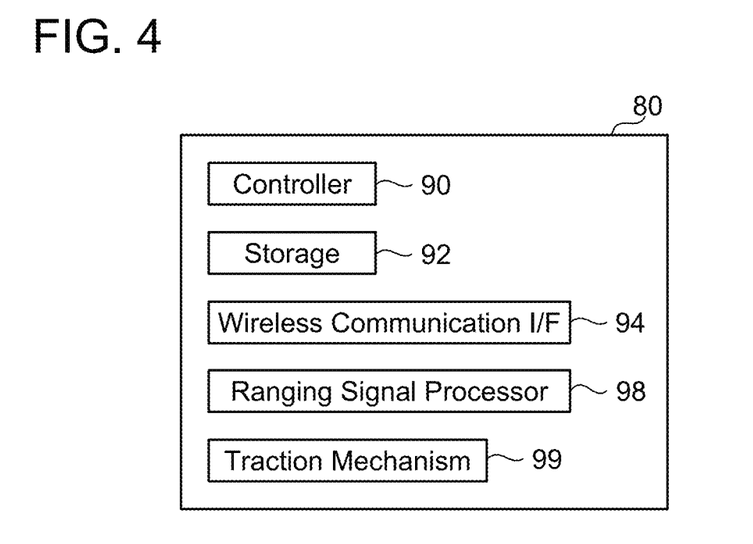
FIG. 4 shows a configuration of a second mobile body.

The second mobile body 80 is a vehicle such as an automobile or the like, as with the first mobile body 50. The location information system 10 estimates the location of the second mobile body 80. This allows a passenger in the second mobile body 80 to know his/her present location. As shown in FIG. 4, the second mobile body 80 includes a controller 90, a storage 92, a wireless communication I/F 94, a ranging signal processor 98, and a traction mechanism 99. The traction mechanism 99 is the same as the traction mechanism 69. The storage 92 is the same as the storage 62.

The wireless communication T/F 94 has the same configuration as those of the wireless communication I/Fs 34 and 64. Owing to the wireless communication I/F 94, the second mobile body 80 is wirelessly communicable with external devices via the mobile communications network 4. The wireless communication I/F 94 is wirelessly communicable with the base stations 20, 22, 24, and 26. The ranging signal processor 98 has the same configuration as that of the ranging signal processor 36.

The controller 90 is connected communicably with the storage 92, the wireless communication I/F 94, and the ranging signal processor 98 by wiring (not shown). The controller 90 includes a CPU and a memory. The controller 90 controls the storage 92, the wireless communication I/F 94, and the ranging signal processor 98 in accordance with a computer program stored in the memory. The controller 90 is included, for example, in a navigation system that displays the present location of the second mobile body 80, a route to a destination, and/or the like.

(Base Station Location Estimating Process)

The base stations 20, 22, 24, and 26 are immobile. A location P20 of the base station 20 is represented as (x0, y0, z0) relative to a preset reference point (0, 0, 0). Similarly, a location P22 of the base station 22 is represented as (x2, y2, z2), a location P24 of the base station 24 is represented as (x4, y4, z4), and a location P26 of the base station 26 is represented as (x6, y6, z6). At the time when the base stations 20, 22, 24, and 26 were installed, the locations of the base stations 20, 22, 24, and 26 were not identified. The locations of the base stations 20, 22, 24, and 26 are estimated through a base station location estimating process.

Figure 5:
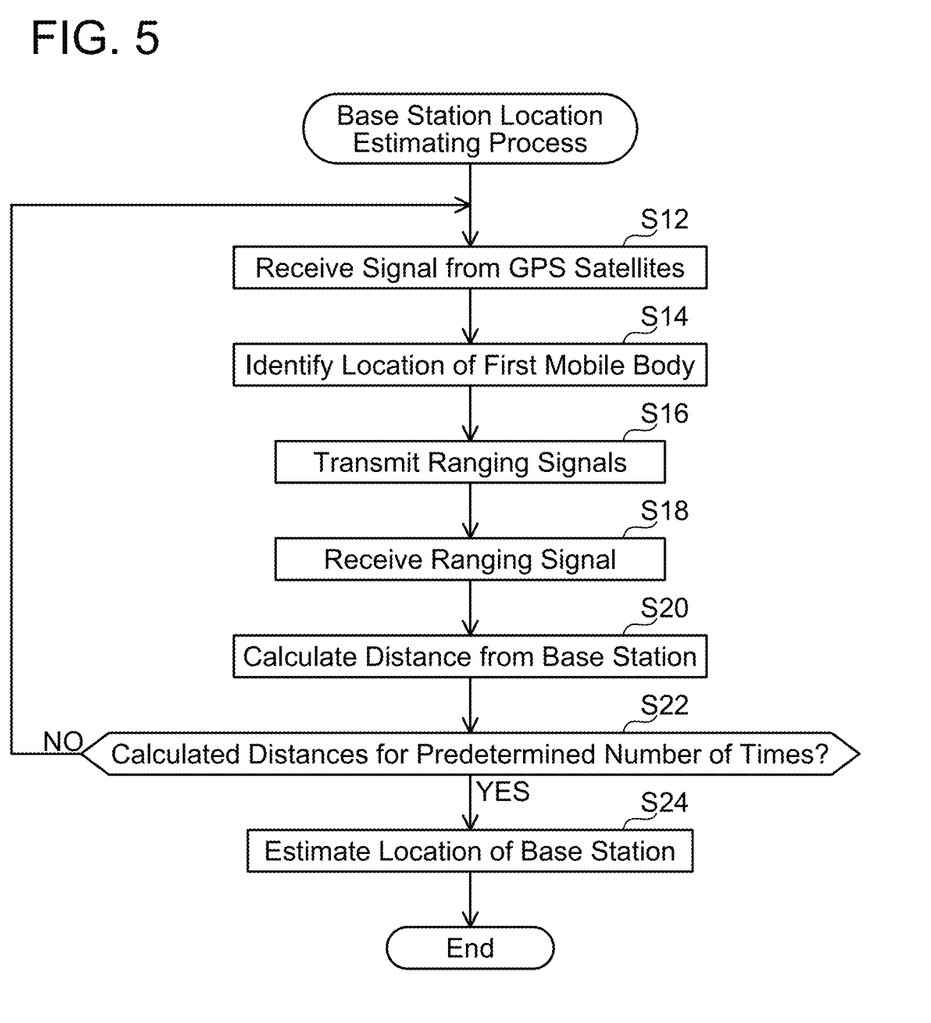
FIG. 5 shows a flowchart of a base station location estimating process.

The base station location estimating process is executed by the controller 60 of the first mobile body 50. The controller 60 executes the base station location estimating process while moving the first mobile body 50. In the base station location estimating process, the controller 60 first identifies a location P50 (x50, y50, z50) of the first mobile body 50. In S12, the controller 60 obtains locating signals received by the location identifier 66 from UPS satellites. Then, in S14, the controller 60 identifies the location P50 of the first mobile body 50. Using the locating signals received by the location identifier 66 from the plurality of GPS satellites, the controller 60 identifies the locations of the GPS satellites and time periods from the emission of the locating signals to the receipt of them at the location identifier 66. Next, using the time periods until the receipt of the locating signals, the controller 60 calculates distances from the first mobile body 50 to the GPS satellites. The controller 60 identifies the location P50 of the first mobile body 50 using the locations of the GPS satellites and the distances from the first mobile body 50 to the GPS satellites. The controller 60 causes the storage 62 to store location information indicating the identified location P50 of the first mobile body 50. In the base station location estimating process, steps from S12 to S22 are executed repeatedly. In S14, the controller 60 cumulatively stores location information without deleting one or more pieces of location information indicating the location P50 of the first mobile body 50 that have been already stored in the storage 62 as a result of the step S14 having been executed before.

Next, in S16, the controller 60 causes each of the ranging sensors 68a and 68b to transmit a ranging signal. Each of the ranging sensors 68a and 68b transmits the signal such that the signal is distinguishable from the ranging signal transmitted from the other ranging sensor. The controller 60 stores the time when each of the ranging signals was transmitted. When the ranging signal processor 36 receives the ranging signals, the controller 30 of the base station 20 causes the ranging signal processor 36 to transmit a ranging signal. When receiving the ranging signal from one of the ranging sensors 68a and 68b, the ranging signal processor 36 transmits a ranging signal that includes the same signal as the received ranging signal. In S18, the controller 60 causes the ranging sensors 68a and 68b to receive the ranging signal transmitted from the base station 20. The controller 60 determines which of the ranging signal transmitted from the ranging sensor 68a and the ranging signal transmitted from the ranging sensor 68b is included in the ranging signal received by the ranging sensors 68a and 68b. The controller 60 causes the storage 62 to store the time when the ranging signal was received as the time when the ranging signal was received by the determined ranging sensor among the ranging sensors 68a and 68b.

Then, in S20, the controller 60 calculates distances between the ranging sensors 68a, 68b and the base station 20. Specifically, for the ranging sensor 68a, the controller 60 first calculates a difference between the time when the ranging signal was transmitted in S16 and the time when the ranging signal from the ranging sensor 68a was received in S18. Then, the controller 60 calculates, as a distance between the ranging sensor 68a and the base station 20, a half of a distance calculated by multiplying the traveling speed of the ranging signal by the time difference. The controller 60 causes the storage 62 to store a combination of distance information indicating the calculated distance between the ranging sensor 68a and the base station 20 and location information indicating the location of the ranging sensor 68a. The location information indicating the location of the ranging sensor 68a is the same as the location information already stored in the storage 62 in immediately precedent step S14, that is, the location information indicating the location of the first mobile body 50. In the same way, the controller 60 calculates a distance between the ranging sensor 68b and the base station 20. The controller 60 causes the storage 62 to store a combination of distance information indicating the calculated distance between the ranging sensor 68b and the base station 20 and location information indicating the location of the ranging sensor 68b. The location of the ranging sensor 68b is obtained by subtracting a height difference between the ranging sensors 68a and 68b from the location of the ranging sensor 68a, that is, the location of the first mobile body 50. Hereinbelow, the location of the ranging sensor 68a and the location of the ranging sensor 68b will be collectively termed the location of the first mobile body 50.

The above has described about communication of ranging signals with the base station 20 and calculation of distances from the base station 20. However, as with the base station 20, one or more of the base stations 22, 24, and 26 that received the ranging signals transmitted from the first mobile body 50 in S16 each transmits a ranging signal to the first mobile body 50. As a result, in S18, one or more ranging signals are received from the one or more of the base stations 22, 24, and 26. In S20, for each of the one or more base stations, the controller 60 calculates distances from the base station, which is the transmitter of the ranging signal, by executing the same as the calculation of distances from the base station 20, and causes the storage 62 to store combinations of the calculated distances and the location information indicating the location of the first mobile body 50.

Then, in S22, the controller 60 determines whether distances have been calculated for a predetermined number of times. The predetermined number of times is equal to or more than the number of combinations of location information and distance information that is required to identify the location of the base station 20, specifically combinations of the location information indicating the location of the first mobile body 50, that is, the locations of the ranging sensors 68*a* and 68*b*, and the distance information indicating the distance between the first mobile body 50 and the base station 20. For example, the predetermined number of times may be four times or may be five times or more.

If the distances have not been calculated for the predetermined number of times (NO in S22), the process returns to S12 and steps S12 to S20 are executed again. The first mobile body 50 executes the base station location estimating process while moving. Therefore, each time the series of steps S12 to S20 is executed, a different combination of the location of the first mobile body 50 and distance from the base station 20 is calculated.

If the distances have been calculated for the predetermined number of times (YES in S22), the controller 60 estimates, in S24, the location of the base station 20 using the predetermined number of combinations of plural pieces of distance information each indicating distance from the base station 20 and plural pieces of location information each indicating the location of the first mobile body 50.

With the location P20 of the base station 20=(x20, y20, z20) and a location P50*k* of the first mobile body 50 at a specific timing=(x50*k*, y50*k*, z50*k*), a distance D20*k* between the first mobile body 50 and the base station 20 at the specific timing can be represented in the formula below.

$$D^2 20k = \|P50k - P20\|^2 \qquad \text{[Formula I]}$$

As with D20*k*, where the locations of the base stations 22, 24, and 26 are respectively represented as P22, P24, and P26, each of distances D22*k*, D24*k*, and D26*k* between the first mobile body 50 and the base stations 22, 24, and 26 at the specific timing can be represented in the above formula. However, using GPS signals and ranging signals to estimate locations and measure distances may have errors due to signal transmission noise, time clocked by the first mobile body 50 being different from the actual time, and/or the like. The controller 60 estimates the locations of the base stations 20, 22, 24, and 26 such that an evaluation value J calculated from the formula below becomes minimum.

$$J = \sum_{k}^{M} \sum_{i}^{N} \{\|P50k - Pi\|^2 - D^2 ki\}^2 \qquad \text{[Formula 2]}$$

Here, M is the predetermined number of times. P50*k* is the location P50 of the first mobile body 50 at $k^{th}$ time, where it is distinguished between the ranging sensors 68*a* and 68*b*. Pi is the locations of a plurality of base stations i, where i includes 20, 22, 24, and 26. Dki is a distance between the base station i and the first mobile body 50 at $k^{th}$ time, where it is distinguished between the ranging sensors 68*a* and 68*b*.

(Mobile Body Location Estimating Process)

Figure 6:
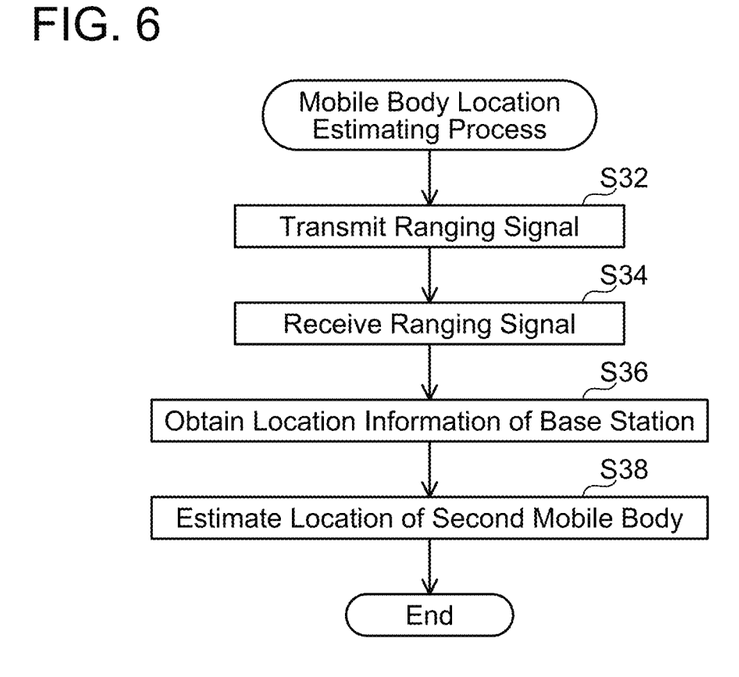
FIG. 6 shows a flowchart of a mobile body location estimating process.

Next, a mobile body location estimating process executed by the controller 90 will be described with reference to FIG. 6. The mobile body location estimating process estimates the location of the second mobile body 80. In the mobile body location estimating process, the controller 90 first causes the ranging signal processor 98 to transmit a ranging signal in S32. When the ranging signal processor 36 receives the ranging signal, the controller 30 of the base station 20 causes the ranging signal processor 36 to transmit a ranging signal. When receiving the ranging signal from the ranging signal processor 98, the ranging signal processor 36 transmits a ranging signal that includes the same signal as the received ranging signal. Similarly, when the ranging signal processors of the base stations 22, 24, and 26 receive the ranging signal, the controllers of the base stations 22, 24, and 26 cause the ranging signal processors to transmit ranging signals.

In S34, the controller 90 causes the ranging signal processor 98 to receive the ranging signals transmitted from the base stations 20, 22, 24, and 26. In S36, the controller 90 obtains plural pieces of location information respectively indicating the locations of the base stations 20, 22, 24, and 26 from the base stations 20, 22, 24, and 26 via the wireless communication I/F 94. Then, in S38, the controller 90 estimates the location of the second mobile body 80. Specifically, the controller 90 first calculates a distance between the second mobile body 80 and the base station 20 using the time when the ranging signal was transmitted in S32, the time when the ranging signal from the base station 20 was received in S34, and the traveling speeds of the ranging signals. Similarly, the controller 90 calculates distances between the second mobile body 80 and each of the base stations 22, 24, and 26.

Then, the controller 90 calculates the location of the second mobile body 80 using a relational expression between the location P80 of the second mobile body 80, the location P20 of the base station 20, and the distance D80 between the second mobile body 80 and the base station 20, namely $D^2 80 = \|P80 - P20\|^2$, and using the location of the second mobile body 80, the locations of the base stations 22, 24, and 26, and the distances between the second mobile body 80 and each of the base stations 22, 24, and 26.

When estimating the location of the second mobile body 80 from positional relationship with four or more base stations 20, 22, 24, and 26, the controller 90 estimates, as in the base station location estimating process, the location of the second mobile body 80 such that evaluation values J are minimized, where the evaluation values J are differences between distances between each of the base stations 20, 22, 24, and 26 and the location of the second mobile body 80 calculated from the location of the second mobile body 80 and the locations of the base stations 20, 22, 24, and 26 and distances between each of the base stations 20, 22, 24, and 26 and the location of the second mobile body 80 obtained by the transmission and receipt of the ranging signals.

(Effects)

In the location information system 10, the first mobile body 50 includes the location identifier 66 to identify the location of the first mobile body 50, while none of the base stations 20, 22, 24, and 26 includes a device configured to receive signals from GPS satellites. This simplifies configuration of the plurality of base stations 20, 22, 24, and 26 included in the location information system 10. Further, in the location information system 10, the base stations 20, 22, 24, and 26 do not have to receive signals from GPS satellites, and therefore the base stations 20, 22, 24, and 26 can be installed at places where signals from GPS satellites are hard to reach (e.g., indoors).

Each of the locations of the base stations 20, 22, 24, and 26 is estimated from the location of the first mobile body 50 and the distance between the base station and the first mobile body 50. The base stations 20, 22, 24, and 26 can identify the locations of the base stations 20, 22, 24, and 26 without receiving any signals from GPS satellites. Thus, the locations of the base stations 20, 22, 24, and 26 do not have to be precisely identified in advance.

The first mobile body 50 identifies distances between itself and each of the base stations 20, 22, 24, and 26 by transmitting ranging signals, and estimates the locations of the base stations 20, 22, 24, and 26. Thus, there is no need to separately provide a device to estimate the locations of the base stations 20, 22, 24, and 26.

To estimate the locations of the base stations 20, 22, 24, and 26, the first mobile body 50 identifies distances between itself and each of the base stations 20, 22, 24, and 26 at a plurality of points. According to this configuration, the first mobile body 50 can estimate the location of the single base station 20 by identifying the locations of the first mobile body 50 and distances between the first mobile body 50 and the base station 20 at the plurality of points. Thus, when estimating the location of the single base station 20, the first mobile body 50 does not have to estimate the locations of the other base stations 22, 24, and 26. The present embodiment improves the accuracy for estimation of the location of the base station 20 by identifying the locations of the first mobile body 50 and distances between the first mobile body 50 and the base station 20 at the plurality of points to estimate the location of the single base station 20.

In the base station location estimating process, the first mobile body 50 cumulatively store, in the storage 62, the location of the first mobile body 50 identified in S14 and the distances between the first mobile body 50 and each of the base stations 20, 22, 24, and 26 calculated in S20. According to this configuration, the first mobile body 50 can estimate the locations of the base stations 20, 22, 24, and 26 using the location of the first mobile body 50 identified in S14 and the distances between the first mobile body 50 and each of the base stations 20, 22, 24, and 26 calculated in S20 that are cumulatively stored in the storage 62. Thus, according to this configuration, the first mobile body 50 can estimate the locations of the base stations 20, 22, 24, and 26 anytime, as long as it stores in advance the location of the first mobile body 50 identified in S14 and distances between the first mobile body 50 and each of the base stations 20, 22, 24, and 26 calculated in S20.

The first mobile body 50 causes the ranging sensors 68a and 68b, which are disposed at different height levels, to transmit ranging signals to identify distances between the ranging sensors 68a, 68b and the base stations 20, 22, 24, and 26. This can avoid erroneous estimation for height-wise locations of the base stations 20, 22, 24, and 26 when the height-wise position of the first mobile body 50 is unchanged in the base station location estimating process.

As is apparent from the forgoing description, the controller 90 is an example of the "location obtainer device".

Second Embodiment

In this embodiment, the configuration of the location identifier 66 of the first mobile body 50 is different from that of the first embodiment. Further, the steps for identifying the location of the first mobile body 50 in S12 and S14 in the base station location estimating process are different from those of the first embodiment. In the present embodiment, the location identifier 66 includes, instead of the GPS antenna, an emitter configured to emit laser light and a photoreceiver configured to receive laser light reflected by hitting surrounding objects. Further, the storage 62 stores in advance an environment map that shows arrangements of buildings and objects around the first mobile body 50.

In S12 and S14 of the base station location estimating process, the location of the first mobile body 50 is identified using Light Detection and Ranging (LiDAR). Specifically, in S12, the controller 60 causes the location identifier 66 to emit laser light and receive reflected laser light from surrounding buildings and the like. In S14, the controller 60 then detects shapes of the buildings and the like around the first mobile body 50 from the timing when the laser light was received. Then, the controller 60 identifies the location of the first mobile body 50 by comparing the detected shapes and the environment map stored in the storage 62.

With the above configuration, the first mobile body 50 does not have to receive signals from the GPS satellites. Therefore, the location of the first mobile body 50 can be identified even while the first mobile body 50 is traveling through places where signals from the GPS satellites are hard to reach. In a variant, the location identifier 66 of the first mobile body 50 may include a GPS antenna, an emitter configured to emit laser light, and a photoreceiver configured to receive laser light reflected by hitting surrounding objects. In this case, the controller 60 may identify the location of the first mobile body 50 using either of location identification using ranging signals from the GPS satellites or location identification using the LiDAR.

Third Embodiment

As shown in FIG. 1, in this embodiment, a server 100 is installed. The server 100 is communicable, via the mobile communications network 4, with the first mobile body 50, the base stations 20, 22, 24, and 26, and the second mobile body 80. The server 100 is disposed outside the location information system 10. In the present embodiment, the server 100 is configured to execute a process for identifying the location of the first mobile body 50, a process for estimating the locations of the base stations 20, 22, 24, and 26, and a process for identifying the location of the second mobile body 80. Specifically, the controller 60 transmits ranging signals from the GPS satellites to the server 100, as in S12. The server 100 identifies the location of the first mobile body 50 by executing the same step as S14 using the received ranging signals from the GPS satellites. The server 100 transmits location information indicating the location of the first mobile body 50 to the first mobile body 50. As a result, the controller 60 obtains the location information indicating the location of the first mobile body 50.

The controller 60 then calculates distances from the base stations 20, 22, 24, and 26 by executing steps S16 to S20. Next, the controller 60 transmits plural pieces of distance information respectively indicating the calculated distances to the server 100. In the server 100, the locations of the base stations 20, 22, 24, and 26 are estimated using the received plural pieces of distance information and the location information indicating the location of the first mobile body 50. The server 100 transmits plural pieces of location information respectively indicating the estimated locations of the base stations 20, 22, 24, and 26 to corresponding base stations 20, 22, 24, and 26. The controller 30 of the base station 20 obtains the location information by receiving the location information from the server 100. The same applies to the controllers of the base stations 22, 24, and 26.

Further, the controller 90 of the second mobile body 80 transmits, to the server 100, plural pieces of distance information respectively indicating distances between the second mobile body 80 and the base stations 20, 22, 24, and 26 that are obtained by executing steps S32 and S34. The server 100 estimates, as in S38, the location of the second mobile body 80 using the received plural pieces of distance information and the plural pieces of location information indicating the locations of the base stations 20, 22, 24, and 26. The server 100 transmits location information indicating the estimated location of the second mobile body 80 to the second mobile body 80. The controller 90 of the second mobile body 80 obtains the location information by receiving the location information from the server 100.

In the present embodiment, the location information system 10 does not have to include a device configured to execute a process for identifying the location of the first mobile body 50, a process for estimating the locations of the base stations 20, 22, 24, and 26, and a process for identifying the location of the second mobile body 80. This simplifies the location information system 10. In a variant, the server 100 may execute one or more of the process for identifying the location of the first mobile body 50, the process for estimating the locations of the base stations 20, 22, 24, and 26, and the process for identifying the location of the second mobile body 80.

While specific examples of the present disclosure have been described above in detail, these examples are merely illustrative and place no limitation on the scope of the patent claims. The technology described in the patent claims also encompasses various changes and modifications to the specific examples described above.

(Variants)

(1) In the base station location estimating process, the locations of the base stations 20, 22, 24, and 26 may be estimated using plural pieces of distance information each indicating a distance between a pair of two base stations among the plurality of base stations 20, 22, 24, and 26, in addition to the location of the first mobile body 50 and the distances between the first mobile body 50 and the base stations 20, 22, 24, and 26. The distances between the base stations may be identified by the base stations 20, 22, 24, and 26 communicating ranging signals with each other, or may be stored in advance in the base stations 20, 22, 24, and 26 or in the first mobile body 50. In this case, estimated locations of the base stations 20 and 22 may be identified such that a difference between a distance between the base stations 20 and 22 calculated from estimated locations of the base stations 20 and 22 and a known distance between the base stations 20 and 22 is minimized. The same applies to the other base stations 24 and 26.

(2) At least one of the base stations 20, 22, 24, and 26 may be mobile. In this case, the at least one mobile base station may include a moving mechanism such as a traction mechanism, a flying mechanism, or the like. Alternatively, the at least one mobile base station may float on the surface of an ocean, a lake, or the like, and may be mobile along with up-and-down motions of the water surface.

(3) The first mobile body 50 and the second mobile body 80 may move by flying, such as a drone or the like.

(4) The first mobile body 50 includes the ranging sensors 68*a* and 68*b*, however, the configuration of the ranging signal processor 68 is not limited thereto. For example, the first mobile body 50 may include another ranging sensor in addition to the ranging sensors 68*a* and 68*b*. In this case, the additional ranging sensor may be disposed at the same height level as at least one of the ranging sensors 68*a* and 68*b* and at a different position. Similarly, each of the second mobile body 80, the base stations 20, 22, 24, and 26 may include a plurality of ranging sensors. Further, for example, the first mobile body 50 may include only one ranging sensor 68*a*. In this case, the ranging sensor 68*a* may be mobile in the first mobile body 50. For example, the ranging sensor 68*a* may be mobile at least in up-down direction or may be rotatable.

(5) The location information system 10 may include a plurality of first mobile bodies 50. In this case, each of the first mobile bodies 50 may include either one of the ranging sensors 68*a* and 68*b*.

(6) The base station location estimating process may be executed by a controller other than the controller 60, for example, by the controller 30 or any one of the controllers of the base stations 22, 24, and 26. Similarly, the mobile body location estimating process may be executed by a controller other than the controller 90, for example, by the controller 30 or the controller 60.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A location information system comprising:
a first mobile body;
a plurality of base stations communicable with the first mobile body; and
a location obtainer device mounted on a second mobile body and communicable with the plurality of base stations,
wherein
the first mobile body comprises:
a moving mechanism configured to move the first mobile body;
a first location obtainer configured to obtain first location information indicating a location of the first mobile body; and
a base station location transmitter configured to transmit, to each of the plurality of base stations, base station location information indicating an estimated location of the base station,
each of the plurality of base stations comprises:
a base station location obtainer configured to obtain the base station location information by receiving the base station location information, wherein the location of the base station is obtained by using the first location information and a distance between the first mobile body and the base station, and
the location obtainer device comprises:
a second location obtainer configured to obtain second location information indicating a location of the second mobile body, wherein the location of the second mobile body is obtained by using one or more of the base station location information obtained by one or more of the plurality of base stations and a distance between the second mobile body and the one or more of the plurality of base stations.

2. The location information system as in claim 1, wherein the first mobile body further comprises:
- a distance obtainer configured to obtain plural pieces of distance information, wherein the plural pieces of distance information indicate respective distances between the first mobile body and the plurality of base stations; and
- a base station location estimator configured to estimate the estimated locations of the plurality of base stations by using the obtained plural pieces of distance information.

3. The location information system as in claim 2, wherein at each of a plurality of timings while the first mobile body is moving,
- the first location obtainer is configured to obtain the first location information,
- for the respective base stations, the distance obtainer is configured to obtain the plural pieces of distance information between the first mobile body and the base stations, and
- for the respective base stations, the base station location estimator is configured to estimate locations of the base stations by using the obtained plural pieces of first location information and the plural pieces of distance information.

4. The location information system as in claim 3, wherein the first mobile body further comprises a storage controller configured to cause a storage to cumulatively store the obtained plural pieces of distance information and the obtained plural pieces of first location information, and
- for each of the plurality of base stations, the base station location estimator is configured to estimate the location of the base station by using corresponding one of the plural pieces of first location information and corresponding one of the plural pieces of distance information which are cumulatively stored in the storage.

5. The location information system as in claim 1, wherein
- the first location obtainer is configured to obtain the first location information from an external server,
- the base station location obtainer is configured to obtain the base station location information from the external server, and
- the second location obtainer is configured to obtain the second location information from the external server.

6. The location information system as in claim 1, wherein the plurality of base stations is immobile.

7. The location information system as in claim 1, wherein the first mobile body further comprises:
- a plurality of distance obtainers disposed at different height levels, wherein each of the plurality of distance obtainers is configured to obtain distance information indicating a distance between the distance obtainer and a specific base station of the plurality of the base stations; and
- a base station location estimator configured to estimate locations of the base stations,
- the first location information comprises plural pieces of first location information indicating locations of the plurality of distance obtainers,
- the first location obtainer is configured to obtain the plural pieces of first location information, and
- the base station location estimator is configured to estimate a location of the specific base station by using the plural pieces of first location information indicating the locations of the plurality of distance obtainers at each of a plurality of points while the first mobile body is moving and the plural pieces of distance information indicating distances between the specific base station and the plurality of distance obtainers.

8. A location information system comprising:
- a first mobile body;
- a plurality of base stations communicable with the first mobile body; and
- a location obtainer device mounted on a second mobile body and communicable with the plurality of base stations, wherein
the first mobile body comprises:
- a moving mechanism configured to move the first mobile body;
- a first location obtainer configured to obtain first location information indicating a location of the first mobile body; and
- a base station location transmitter configured to transmit, to each of the plurality of base stations, base station location information indicating an estimated location of the base station, each of the plurality of base stations comprises:
- a base station location obtainer configured to obtain the base station location information by receiving the base station location information, wherein the location of the base station is obtained by using the first location information and a distance between the first mobile body and the base station, the second mobile body is different from the first mobile body and located at different location from the location of the first mobile body, and the location obtainer device comprises:
- a second location obtainer configured to obtain second location information indicating a location of the second mobile body, wherein the location of the second mobile body is obtained by using one or more of the base station location information obtained by one or more of the plurality of base stations and a distance between the second mobile body and the one or more of the plurality of base stations.

9. The location information system as in claim 8, wherein the first mobile body further comprises:
- a distance obtainer configured to obtain plural pieces of distance information, wherein the plural pieces of distance information indicate respective distances between the first mobile body and the plurality of base stations;
- a base station location estimator configured to estimate the estimated locations of the plurality of base stations by using the obtained plural pieces of distance information.

10. A location information system comprising:
- a first mobile body;
- a plurality of base stations communicable with the first mobile body; and
- a location obtainer device mounted on a second mobile body and communicable with the plurality of base stations, wherein
the first mobile body comprises:
- a moving mechanism configured to move the first mobile body;
- a first location obtainer configured to obtain first location information indicating a location of the first mobile body;
- a distance obtainer configured to obtain plural pieces of distance information, wherein the plural pieces of distance information indicate respective distances between the first mobile body and the plurality of base stations;

a base station location estimator configured to estimate estimated locations of the plurality of base stations by using the obtained plural pieces of distance information; and a base station location transmitter configured to transmit, to each of the plurality of base stations, base station location information indicating the estimated location of the base station, each of the plurality of base stations comprises:

a base station location obtainer configured to obtain the base station location information by receiving the base station location information, wherein the location of the base station is obtained by using the first location information and a distance between the first mobile body and the base station, the second mobile body is different from the first mobile body and located at different location from the location of the first mobile body, and the location obtainer device comprises:

a second location obtainer configured to obtain second location information indicating a location of the second mobile body, wherein the location of the second mobile body is obtained by using one or more of the base station location information obtained by one or more of the plurality of base stations and a distance between the second mobile body and the one or more of the plurality of base stations.

\* \* \* \* \*